United States Patent
Buchheim et al.

(10) Patent No.: US 6,505,973 B2
(45) Date of Patent: Jan. 14, 2003

(54) BEARING ARRANGEMENT AND METHOD FOR FIXING AT LEAST ONE BEARING IN PLACE IN A BEARING RETAINER

(75) Inventors: Burkhard Buchheim, Schweinfurt (DE); Berthold Beyfuss, Kaisten (DE); Helmut Hauck, Euerbach (DE); Peter Horling, Mainberg (DE)

(73) Assignee: SKF GmbH, Schweinfurt (DE)

( * ) Notice: Subject to any disclaimer, the term of this patent is extended or adjusted under 35 U.S.C. 154(b) by 56 days.

(21) Appl. No.: 09/758,359

(22) Filed: Jan. 12, 2001

(65) Prior Publication Data

US 2001/0012418 A1 Aug. 9, 2001

(30) Foreign Application Priority Data

Jan. 15, 2000 (DE) ........................ 100 01 5752

(51) Int. Cl.[7] ............................................... F16C 43/04
(52) U.S. Cl. ..................... 384/537; 29/898.07; 384/585
(58) Field of Search ..................... 29/898.07; 384/537, 384/585, 584

(56) References Cited

U.S. PATENT DOCUMENTS

| | | | | |
|---|---|---|---|---|
| 1,489,013 A | * | 4/1924 | Schatz | 29/898.07 |
| 2,427,072 A | * | 9/1947 | Rubin | 29/898.07 |
| 2,858,174 A | | 10/1958 | Mitchell | |
| 3,182,379 A | * | 5/1965 | Bachelet et al. | 29/898.07 |
| 4,125,298 A | * | 11/1978 | Heurich et al. | 29/898.07 |
| 4,506,936 A | | 3/1985 | Miller | |
| 4,640,632 A | | 2/1987 | Brandenstein et al. | |
| 4,688,952 A | * | 8/1987 | Setele | 384/537 |
| 4,888,862 A | | 12/1989 | Brandenstein et al. | |
| 6,106,155 A | * | 8/2000 | Beyfuss et al. | 384/537 |
| 6,129,455 A | * | 10/2000 | Galante | 384/537 |
| 6,279,231 B1 | * | 8/2001 | Beyfuss et al. | 29/898.07 |

FOREIGN PATENT DOCUMENTS

| | | |
|---|---|---|
| DE | 36 42 115 C2 | 11/1995 |
| DE | 198 05 237 | 8/1999 |
| EP | 0 485 001 A2 | 5/1992 |
| GB | 2 198 487 A | 6/1988 |

* cited by examiner

Primary Examiner—Thomas R. Hannon
(74) Attorney, Agent, or Firm—Burns, Doane, Swecker & Mathis, L.L.P.

(57) ABSTRACT

A method for fixing at least one bearing in a depression of a bearing retainer involves deforming a portion of the bearing retainer to cause a portion of the bearing retainer to form an overlapping connection of the bearing which axially retains the bearing in the depression. In the first stage of the two-stage deformation process, a first partial area of the bearing retainer is deformed compress the material forming the bearing retainer. In the second stage of the deformation process, a second partial area of the bearing retainer is deformed to form the overlapping connection, in the axial direction, between the bearing and the bearing retainer.

12 Claims, 2 Drawing Sheets

BEARING ARRANGEMENT AND METHOD FOR FIXING AT LEAST ONE BEARING IN PLACE IN A BEARING RETAINER

This application is based on and claims priority under 35 U.S.C. § 119 with respect to German Application No. P 100 01 575.1 filed on Jan. 15, 2000, the entire content of which is incorporated herein by reference.

FIELD OF THE INVENTION

The invention generally relates to bearing retainer. More particularly, the present invention relates to a method for fixing at least one bearing in place in a bearing retainer and a bearing receiver for receiving a bearing.

BACKGROUND OF THE INVENTION

German Offenlegungsschrift No. DE 198 05 237 discloses positioning bearings into a bearing retainer and fixing them in place by shaping the material on the front face of the bearing retainer. The shaped material covers a shoulder area arranged around the front face of the outer bearing ring, and in this way constitutes an interlocking connection between the bearing and the bearing retainer.

Although quite good results have been achieved with this arrangement, there exists a need for providing a fixation in place for the bearing in the bearing retainer, which is also laid out for extreme loads.

A need thus exists for fixing the bearing in place in the bearing retainer in such a way that it is able to withstand the highest axial loads over an extended and lasting time period.

SUMMARY OF THE INVENTION

In accordance with one aspect of the present invention, a method for fixing at least one bearing in a bearing retainer involves forming at least one depression in the bearing retainer for receiving the bearing, deforming a first partial area of the bearing retainer to compress material constituting the bearing retainer, positioning the bearing in the depression either before or after deformation of the first partial area, and deforming a second partial area of the bearing retainer located at an inside portion of the first partial area to form a connection, interlocking in the axial direction, between the bearing and the bearing retainer.

In accordance with the method of the present invention, a lasting fixation of the bearing in the bearing retainer is achieved by virtue of the material of the first partial area of the bearing retainer being compressed and the compressed material is thereafter shaped in such a way that an interlocking connection between the bearing and the bearing retainer is realized. The present invention is quite advantageous in that the connection between the bearing and the bearing retainer is quite solid and reliable.

Because the shaped material forming the bearing retainer is very highly compressed, it is able to lastingly withstand very high loads. Also, because the highly compressed material hardly yields under high loads, the bearing is prevented from making small axial movements, particularly under load changes. This thus helps prevent the connection between the bearing and the bearing retainer from being exposed to additional pulse-shaped loads which over time could also lead to a deformation or fatigue of the material constituting the interlocking connection.

According to another aspect of the invention, a method for axially retaining at least one bearing in a depression formed in a bearing retainer includes positioning a bearing in the depression of the bearing retainer, and deforming a partial area of the bearing retainer to inwardly displace material forming the bearing retainer and form an inwardly directed projection that engages the bearing to axially retain the bearing in the at least one depression of the bearing retainer.

Another aspect of the invention involves a bearing arrangement that includes a bearing retainer provided with at least one depression and at least one bearing positioned in the at least one depression. A portion of the bearing retainer overlaps with a portion of the at least one bearing so that the at least one bearing is connected in an interlocking manner in the axial direction with the bearing retainer. The bearing retainer is formed of a material having an increased material thickness in the vicinity of the overlap, and the increased material thickness is formed by a two-stage deformation process.

In accordance with another aspect of the invention, a bearing arrangement includes a bearing retainer provided with at least one depression and at least one bearing positioned in the at least one depression. A portion of the material forming the bearing retainer extends inwardly towards the bearing to form a projection that overlaps with a portion of the bearing to axially retain the bearing within the depression.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein.

DETAILED DESCRIPTION OF THE INVENTION

Figure 1:
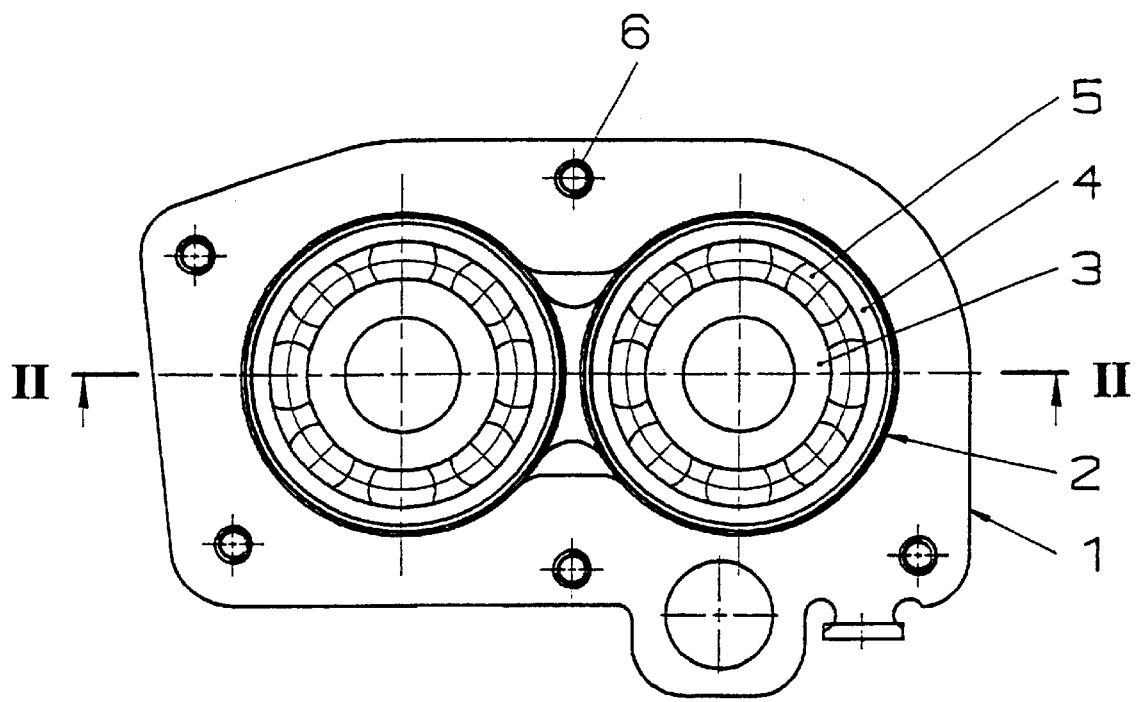
FIG. 1 is a top plan view of the bearing arrangement in accordance with the present invention.

Referring initially to FIG. 1, the bearing arrangement in accordance with the present invention includes two bearings 2 inserted into a bearing retainer 1. Each of the bearings 2 is comprised of an inner ring 3, an outer ring 4 and ball-shaped rolling bodies 5 arranged between the inner ring 3 and the outer ring 4. The bearing retainer 1 is also provided with a number of bores 6 adapted to receive appropriate fasteners for fastening the bearing arrangement in an installation area.

Figure 2:
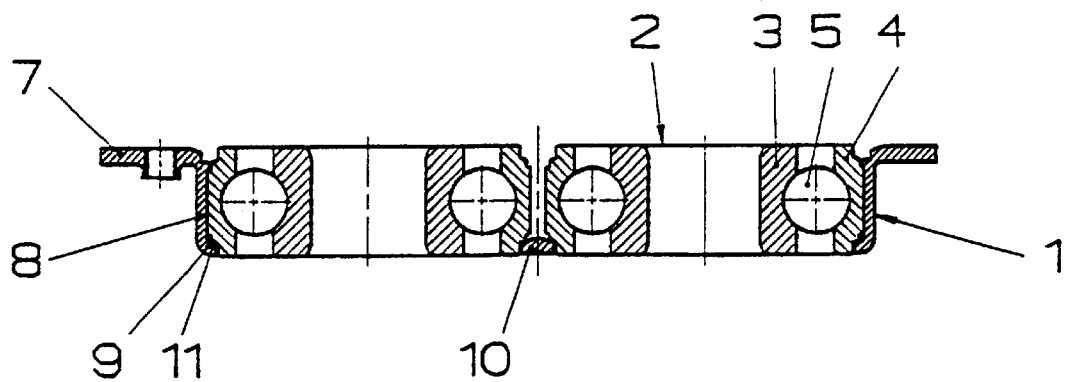
FIG. 2 is a cross-sectional view of the bearing arrangement shown in FIG. 1 taken along the section line II—II in FIG. 1.

As shown in FIG. 2, the bearing retainer 1 is defined by a plate-shaped sheet metal part 7 on which are formed two cylinder-shaped or cylindrically-shaped depressions 8. These depressions extend perpendicular to the plane of the plate. The wall thickness of the surfaces of the cylinder-shaped depressions 8 is reduced to zero in the area between the two bearings 2 so that only a strip 10 arranged on the bottom of the depression 8 remains between the two bearings 2. That is, there is no cylinder-shaped depression in the area between the bearings.

The cylinder-shaped depressions 8 can be produced by means of a deep-drawing process in which, for example, the bottom areas of the cylinder-shaped depressions 8 are each removed by punching out to just a ring-shaped section 9 directly adjoining the surface areas of the cylinder-shaped depressions 8. The ring-shaped sections 9 serve as fastening surfaces for the outer rings 4 of the bearings 2. For this purpose, the outer rings 4 are provided with an annularly extending lower shoulder 11 which rests on the corresponding ring-shaped section 9.

Figure 3:
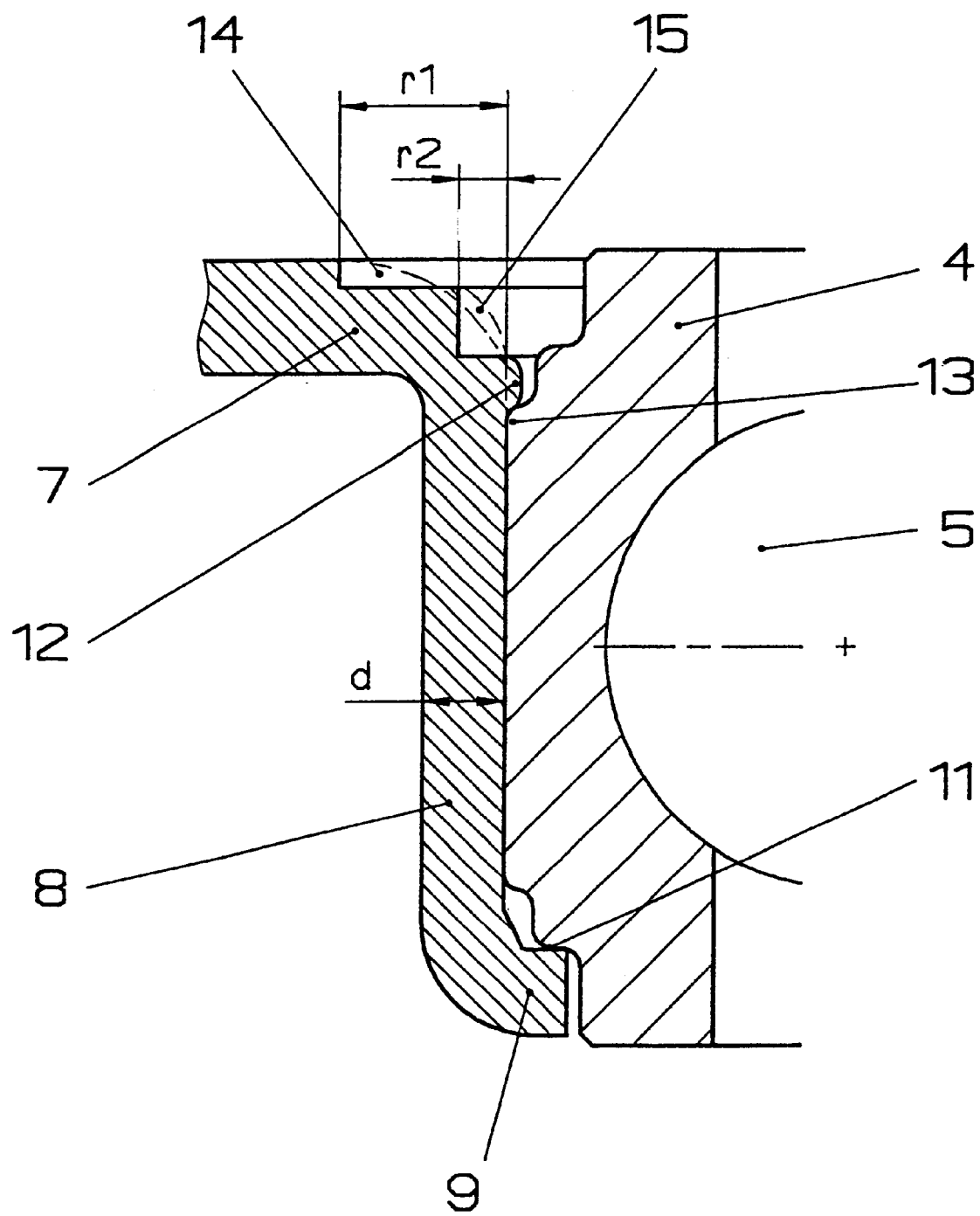
FIG. 3 is an enlarged cross-sectional view of a portion of the bearing arrangement shown in FIG. 2.

Referring to FIG. 3, to achieve a lasting fixation of the bearings 2 in the bearing retainer 1, the bearing retainer 1 is shaped in such a way that an inwardly displaced material portion 12 (i.e., an inwardly directed projection) of the bearing retainer overlaps with an upper shoulder 13 of the outer rings 4. An axial interlocking connection is thus formed between the outer ring 4 and the displaced material 12 to axially retain the bearing in place within the depression 8.

A two-stage deformation process can be employed for forming the axial interlocking connection to thus impart a particularly high degree of stability to the interlocking connection. The bearings 2 are inserted into the respective cylinder-shaped depressions 8 of the bearing retainer 1 until the lower shoulders 11 of the outer rings 4 rest against the ring-shaped sections 9 of the bearing retainer 1. Thereafter, in the first stage of the deformation process, a first pressure ram is pressed against the bearing retainer 1 on the side of the bearing retainer located opposite the lower shoulders 11. The sheet metal element 7 of the bearing retainer is thus indented in a first partial area 14 adjoining the outer rings 4 and having a radial extent r1. The material of the bearing retainer 1 is thus compressed in this first partial area 14.

In the second stage of the deformation process, a second pressure ram is pressed against the bearing retainer 1 so that the material 7 (e.g., sheet metal) of the bearing retainer 1 is deformed in a second partial area 15. This second partial area 15 is located at an inside portion of the first area and has a radial extent r2. This causes material forming the bearing retainer to be displaced inwardly and results in the formation of the inwardly extending displaced material 12 (i.e., an inwardly extending projection) of the bearing retainer 1. The inwardly displaced material 12 extends inwardly beyond the inner surface of the depression 8 as illustrated in FIG. 3 to thus form an overlying ridge. The radial extent r2 of the second area preferably corresponds to about 40% to about 70% of the wall thickness d of the bearing retainer in the area of the depression 8 (i.e., in the cylindrically-shaped portion of the retainer 1). The displaced material 12 yields in the direction toward the outer rings 4 and overlaps the upper shoulders 13 extending around the outer rings 4 to form or produce an axial interlocking connection between the bearing retainer 1 and the outer rings 4.

Thus, the bearing retainer 1 and the bearing 2 overlap one another in such a way that the bearing is connected in an interlocking manner in the axial direction with the bearing retainer. As can be seen from FIG. 3, the material of the bearing retainer has an increased material thickness in the vicinity of the overlap. Also, after the two-stage deformation process, the upper surface of the bearing retainer 1 possesses a two stepped-configuration, i.e., the bearing retainer includes two ledges that are displaced axially downwardly relative to the planar upper surface of the bearing retainer in which are formed the bores 6. That is, the upper surface of the bearing retainer shown in FIG. 3 includes one step or ledge in the second partial area 15 which results after the second stage of the deformation process and another step or ledge defined by a part of the first partial area 14 after the second stage of the deformation process.

Depending on the particular embodiment, the two-stage deformation process can be carried out as described above, i.e. with the outer rings 4 being positioned in the bearing retainer 1 prior to the first stage of the deformation process, followed by the two deformation stages being executed immediately following each other. It is possible here to embody the two pressure rams as a combined tool, or also as two separate tools. As an alternative to this embodiment, the first stage of the deformation process can be performed before the outer rings 4 are positioned in the bearing retainer 1, and the second deformation stage can then be performed with the already partially worked bearing retainer 1.

In addition to bearing retainers 1 which hold two bearings 2, the present invention can also be applied in the same way to retainers 1 which are configured for other numbers of bearings 2.

Moreover, in place of the roller bearings used in the embodiments described above, the bearing retainer 1 in accordance with the present invention can be used in conjunction with other rolling bearings, such as cylinder rolling bearings or tapered rolling bearings, and also sliding bearings.

The principles and preferred embodiments of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method for fixing in place at least one bearing in a bearing retainer comprising:
    forming at least one depression in the bearing retainer for receiving the at least one bearing;
    deforming a first partial area of the bearing retainer to compress material constituting the bearing retainer;
    positioning at least one bearing in the at least one depression either before of after deformation of the first partial area; and
    deforming a second partial area of the bearing retainer located at an inside portion of the first partial area to form a connection, interlocking in the axial direction, between the at least one bearing and the bearing retainer.

2. The method in accordance with claim 1, wherein the deformation of the first partial area and the second partial area is performed after the at least one bearing has been placed into the at least one depression of the bearing retainer.

3. The method in accordance with claim 1, wherein the at least one bearing is placed into the at least one depression of the bearing retainer after deformation of the first partial area of the bearing retainer.

4. A method for axially retaining at least one bearing in at least one depression formed in a bearing retainer comprising:
    positioning at least one bearing in the at least one depression of the bearing retainer; and
    deforming a first partial area of the bearing retainer and a second partial area of the bearing retainer located inwardly from the first partial area to inwardly displace material forming the bearing retainer and form an inwardly directed projection that engages the at least one bearing to axially retain the bearing in the at least one depression of the bearing retainer.

5. The method in accordance with claim 4, the method including deforming the first partial area of the bearing prior to deformation of the second partial area to compress the material forming the bearing retainer.

6. The method in accordance with claim 5, wherein the deformation of the first partial area and the second partial area is performed after the at least one bearing has been placed into the at least one depression of the bearing retainer.

7. The method in accordance with claim 5, wherein the at least one bearing is placed into the at least one depression of the bearing retainer after deformation of the first partial area of the bearing retainer.

8. A bearing arrangement comprising;
- a bearing retainer provided with at least one depression and at least one bearing positioned in the at least one depression;
- a portion of the bearing retainer overlapping with a portion of the at least one bearing so that the at least one bearing is connected in an interlocking manner in the axial direction with the bearing retainer;
- the bearing retainer having an increased material thickness in the vicinity of the overlap;
- wherein the at least one bearing retainer has an outer surface possessing a dual-stepped configuration in an area at least partially surrounding the at least one depression.

9. The bearing arrangement in accordance with claim 8, wherein the at least one bearing includes an outer ring, an inner ring and a plurality of rolling bodies positioned between the inner and outer rings, the outer ring possessing a shoulder engaged by said portion of the bearing retainer.

10. A bearing arrangement comprising;
- a bearing retainer provided with at least one depression and at least one bearing positioned in the at least one depression;
- a portion of the bearing retainer extending inwardly towards the at least one bearing to form a projection that overlaps with a portion of the at least one bearing to axially retain the at least one bearing within the at least one depression;
- wherein the bearing retainer has an outer surface possessing a dual-stepped configuration in an area at least partially surrounding the at least one depression.

11. The bearing arrangement in accordance with claim 10, wherein the at least one bearing includes an outer ring, an inner ring and a plurality of rolling bodies positioned between the inner and outer rings, the outer ring possessing a shoulder engaged by said projection of the bearing retainer.

12. The bearing arrangement in accordance with claim 10, wherein the at least one bearing possesses a shoulder engaged by said projection of the bearing retainer.

\* \* \* \* \*